(12) United States Patent
Williams

(10) Patent No.: US 10,422,282 B2
(45) Date of Patent: Sep. 24, 2019

(54) MOUNTING ARRANGEMENT FOR AN ELECTRICAL HARNESS

(71) Applicant: ROLLS-ROYCE PLC, London (GB)

(72) Inventor: Neil G Williams, Derby (GB)

(73) Assignee: ROLLS-ROYCE plc, London (GB)

( * ) Notice: Subject to any disclaimer, the term of this patent is extended or adjusted under 35 U.S.C. 154(b) by 764 days.

(21) Appl. No.: 14/865,740

(22) Filed: Sep. 25, 2015

(65) Prior Publication Data

US 2016/0097326 A1    Apr. 7, 2016

(30) Foreign Application Priority Data

Oct. 1, 2014   (GB) .................................. 1417320.7

(51) Int. Cl.

| F02C 7/18 | (2006.01) |
| F02C 7/00 | (2006.01) |
| F02C 7/24 | (2006.01) |
| F02C 7/32 | (2006.01) |
| F01D 25/28 | (2006.01) |
| H02G 3/03 | (2006.01) |
| H02G 3/04 | (2006.01) |

(52) U.S. Cl.
CPC ............... *F02C 7/18* (2013.01); *F01D 25/28* (2013.01); *F02C 7/00* (2013.01); *F02C 7/24* (2013.01); *F02C 7/32* (2013.01); *H02G 3/03* (2013.01); *F05D 2260/20* (2013.01); *H02G 3/0437* (2013.01)

(58) Field of Classification Search
CPC ...... F02C 7/00; F02C 7/18; F02C 7/24; F02C 7/32; H02G 3/03; H02G 3/0437; H02G 5/10; F16L 53/70; F01D 9/06; F01D 9/065; F01D 25/28; F01D 25/285; F05D 2240/91; F02K 1/822

See application file for complete search history.

(56) References Cited

U.S. PATENT DOCUMENTS

| 3,035,800 A | * | 5/1962 | McLeod | ............. | H02G 3/0608 |
| | | | | | 248/68.1 |
| 3,494,657 A | | 2/1970 | Harper et al. | | |
| 3,710,568 A | | 1/1973 | Rice | | |
| 5,127,222 A | * | 7/1992 | Ream | .................... | B64D 29/00 |
| | | | | | 60/204 |
| 5,174,110 A | | 12/1992 | Duesler et al. | | |

(Continued)

FOREIGN PATENT DOCUMENTS

| EP | 1921310 A1 | 5/2008 |
| EP | 2330879 A1 | 6/2011 |

(Continued)

OTHER PUBLICATIONS

"Cable Tray Manual" (2005), Cooper B-Line Inc., CTO5MAN, pp. 2-57.*

(Continued)

*Primary Examiner* — Jason H Duger
(74) *Attorney, Agent, or Firm* — Oliff PLC

(57) ABSTRACT

A mounting arrangement for an electrical harness comprises an elongate tray, the tray having a base and raised sides to define a channel. The electrical harness is mounted within the channel and cooling air is directed into the channel to cool the electrical harness.

14 Claims, 2 Drawing Sheets

(56) References Cited

U.S. PATENT DOCUMENTS

| | | | | |
|---|---|---|---|---|
| 5,639,048 A * | 6/1997 | Bartholomew | ........... | F16L 3/26 |
| | | | | 248/49 |
| 6,855,884 B2 * | 2/2005 | Spagnoli | .............. | H02G 3/0443 |
| | | | | 174/100 |
| 9,097,134 B2 * | 8/2015 | Ferch | ......................... | F02C 7/12 |
| 9,184,578 B2 * | 11/2015 | Winn | ................... | H02G 3/0608 |
| 2007/0267214 A1 | 11/2007 | Cardi | | |
| 2012/0103685 A1 | 5/2012 | Blanchard et al. | | |
| 2012/0111598 A1 * | 5/2012 | Pawluk | ................ | H02G 3/0437 |
| | | | | 174/68.3 |

FOREIGN PATENT DOCUMENTS

| | | |
|---|---|---|
| EP | 2708701 A2 | 3/2014 |
| GB | 2318972 A | 5/1998 |

OTHER PUBLICATIONS

Feb. 18, 2016 Search Report issued in European Patent Application No. 15186800.7.

Mar. 5, 2015 Search Report issued in British Patent Application No. 1417320.7.

\* cited by examiner

MOUNTING ARRANGEMENT FOR AN ELECTRICAL HARNESS

This invention relates to mounting and cooling arrangements for electrical harnesses, in particular (although not exclusively) for use in gas turbine engines.

Figure 1:
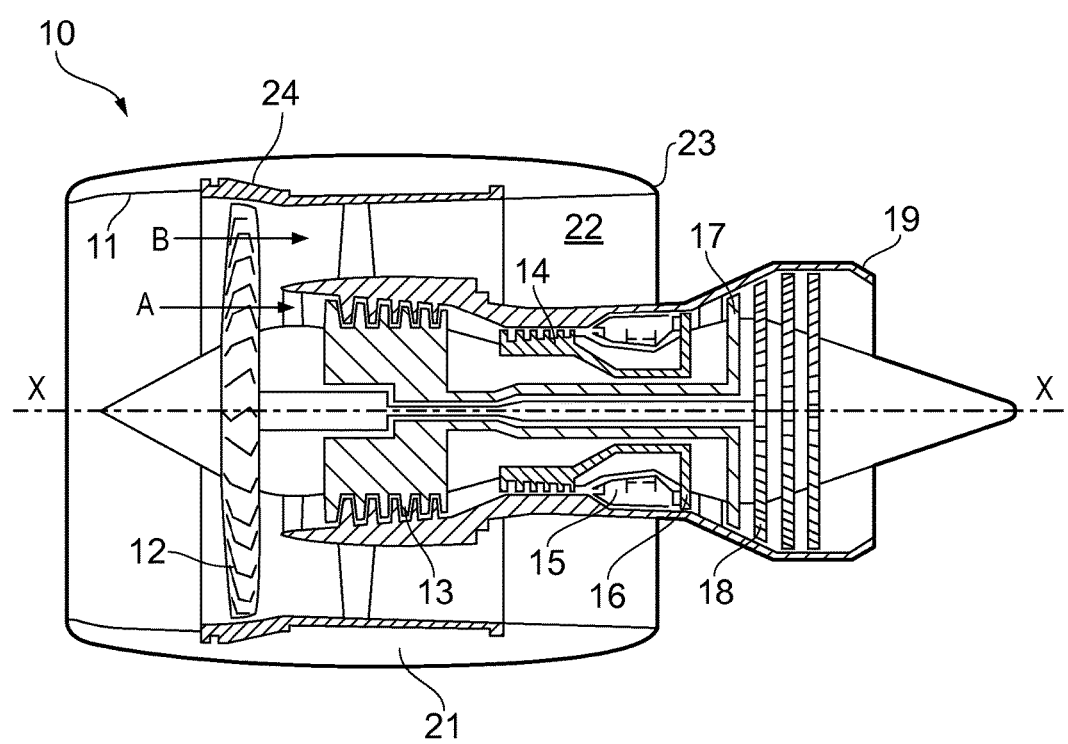

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and together with a fan casing 24 defines the intake 11, a bypass duct 22 and a bypass exhaust nozzle 23.

The intermediate pressure compressor 13, high-pressure compressor 14, combustion equipment 15, high-pressure turbine 16, intermediate pressure turbine 17, low-pressure turbine 18 and core engine exhaust nozzle 19 together define the engine core. A core casing surrounds the engine core and defines the inner annular surface of the bypass duct 22.

Pipes and cables are routed around and along the outside of the engine core and the fan casing. It is known to secure the pipes and cable directly to the casings of the engine by a succession of discrete brackets. It is also known to mount the pipes and cables to a shallow metal harness tray, secured to and extending circumferentially around a fan casing, to provide protection against distortion (for example, if fitters use them as handholds). Such trays are typically formed from pressed metal sheet, and (for stiffness) have upturned sides typically about 10-15 mm in height.

During operation, air entering the intake 11 is accelerated by the fan 12 to produce two air flows: a first or "core" air flow A into the intermediate pressure compressor 13 and a second or "bypass" air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The fire zone commonly referred to as "Zone 3" is formed around the core of the engine and includes the combustion system and turbines. Ventilation air is taken from the bypass duct and injected near to the front or upstream end of the zone; it flows towards the back or downstream end of the engine where it is vented back into the bypass duct. This flow is driven by the difference between the total and static pressures in the bypass duct; because this difference is not very large, the flow velocities are relatively small. Initially, this ventilation air is relatively cool, but of course its temperature rises as it passes through the zone and takes in heat from the surroundings.

Electrical harnesses passing through Zone 3 from the front to the rear are therefore exposed to a steadily increasing temperature; towards the rear this temperature will exceed the capability of the standard PTFE-insulated electrical harnesses, which would degrade and fail if exposed to such temperatures. Therefore, it is common to provide an electrical disconnect at a suitable position within Zone 3, at which the PTFE-insulated harnesses are terminated and the signals are carried onward by mineral-insulated (MI) cables. MI cables have a higher temperature capability than PTFE-insulated cables, and can withstand the increasing temperatures towards the rear of Zone 3.

However, MI cables are mechanically delicate and so their use in gas turbine engines increases the risk of failures in service. It is desirable to minimise the use of MI cable in the engine, in order to maximise reliability; but if PTFE-insulated cable is used in regions approaching its temperature limit, this also increase the risk of failures. It would be desirable to provide a means whereby PTFE-insulated cable could be used throughout more of Zone 3, while keeping its temperature sufficiently low to ensure its reliability, and without requiring excessive amounts of external cooling.

Accordingly, the invention provides a mounting arrangement for an electrical harness, and a gas turbine engine including such an arrangement, as set out in the claims.

Figure 2:
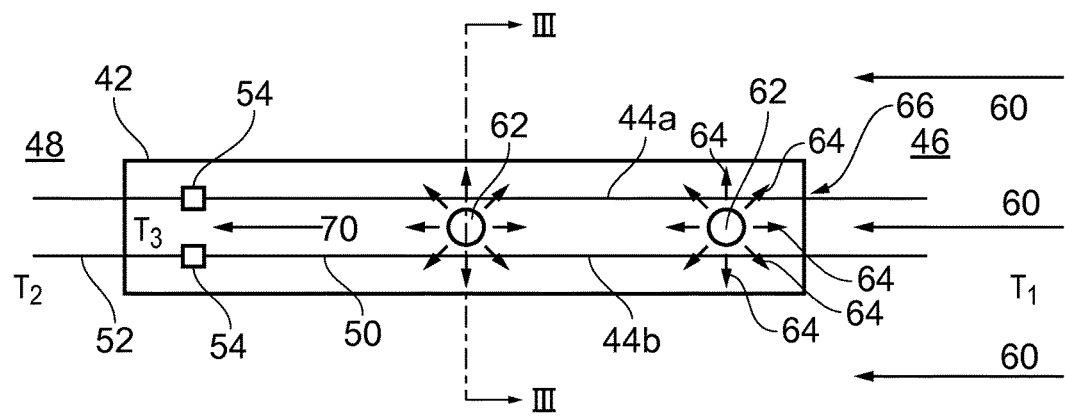
Figure 3:
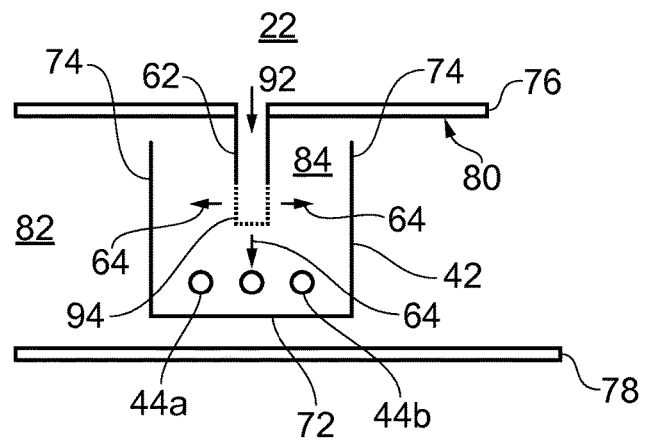

Embodiments of the invention will now be described in more detail, with reference to the attached drawings, in which FIG. 1 shows a schematic cross-sectional view of a gas turbine engine of known type, which has already been described;

FIG. 2 is a schematic plan view of a mounting arrangement according to the invention; and FIG. 3 is a cross-sectional view on the line III-III of FIG. 2.

FIG. 2 shows a mounting arrangement for an electrical harness according to the invention. A tray 42 is mounted to a casing (not shown) of a gas turbine engine by suitable fasteners. If FIG. 2 were to show the whole of the gas turbine engine, the air intake (11 in FIG. 1) would be towards the right and the nozzles (19 and 23 in FIG. 1) towards the left; the normal flow of air through the engine is therefore from the right to the left of FIG. 2. The tray 42 is located in Zone 3, and extends in an axial direction through the zone. The tray 42 extends from a first, front or upstream, region 46 in which the temperature is $T_1$, to a second, rear or downstream, region 48 in which the temperature is $T_2$. As explained previously, $T_2$ is higher than $T_1$. The temperature within Zone 3 increases progressively between region 46 and region 48.

Two cable harnesses 44a, 44b are mounted to the tray 42. Other cable harnesses and pipes may also be mounted to the tray 42, but are not shown in this drawing. The portion 50 of the harness 44b extending from the cooler region 46 is PTFE-insulated cable. The portion 52 of the harness 44b extending beyond the tray and into the hotter region 48 is MI cable. The two portions are joined at a disconnect 54, whose position is chosen to protect the PTFE-insulated cable from excessive temperature. As described previously, a ventilation air flow 60 flows from the front or upstream end of the zone towards the back or downstream end, generally parallel with the alignment of the tray 42. An opening 66 in the upstream end of the tray allows a fraction of the ventilation air flow 60 to flow into the tray 42.

A source of cooling air delivers cooling air through two cooling air ducts 62 into the tray 42. The cooling air ducts 62 have holes or slots towards their ends so that the cooling air flow 64 is distributed in a number of directions into the tray. This ensures that the cooling air flow 64 mixes as quickly as possible into the air flow through the tray 42, effectively flooding it with cooling air. Although the cooling air ducts distribute the cooling air flow 64 in all directions, the effect of the ventilation air flow 60 passing through the tray is to encourage a general flow of air 70 along the tray 42, from its upstream end to its downstream end. This continuous flow of cooling air maintains the tray, and therefore the harnesses 44*a* and 44*b* (together with any other pipes and harnesses), at a lower temperature than the general temperature within Zone 3.

FIG. 3 shows a cross-sectional view on the line III-III of FIG. 2. The tray 42 has a base 72 and side walls 74, which are of the order of 125 mm high. The side walls 74 of the tray extend to within about 10-20 mm of a first fixed structure 76. In this embodiment of the invention, the first fixed structure 76 is an annular core casing extending around the core of the gas turbine engine and forming the inner annular wall of the bypass duct 22. The tray 42 is mounted to a second fixed structure 78. In this embodiment the second fixed structure 78 is an annular casing located radially inward of the core casing 76 and surrounding the combustion equipment (15 in FIG. 1) of the gas turbine engine. Between the core casing 76 and the casing 78 is an annular space 82, which lies within Zone 3 and through which flows the ventilation air flow 60.

Harnesses 44*a* and 44*b* are mounted to the base 72 of the tray 42. Suitable brackets ensure that the harnesses 44*a* and 44*b* are spaced from the base of the tray so that they are principally in contact with the flow of cooling air 70 rather than with a hot metal surface 72.

Cool air 92 sourced from the bypass duct 22 flows through the cooling air duct 62 to provide the cooling air flow 64. As mentioned previously, the end region 94 of the cooling air duct 62 is provided with holes or slots to disperse the cooling air flow 64 in a number of directions.

Because of the close proximity of the side walls 74 to the core casing 76, the proximal surface, or inner wall, 80 of the core casing 76 effectively forms a fourth wall to the channel 84 defined by the base 72 and side walls 74 of the tray 42, so that the air flow within the tray 42 is largely contained within it. The air flow 70 (FIG. 2) therefore flows along the tray 42 with little, if any, leakage of air between the channel 84 and the annular space 82. The cooling air 64 therefore provides effective cooling of the cable harnesses 44*a*, 44*b* (and of any other pipes or harnesses in the tray 42). The static pressure within the tray 42 is very similar to the static pressure in the space 82, which also helps to minimise leakage.

Although the side walls 74 are close to the inner wall 80 of the nacelle, it is desirable for the two to be separated by a small gap, to avoid damage in case of any relative movement between the two in operation. Because the annular casing 78 and the core casing 76 are separate components mounted to different structures of the gas turbine engine, it would introduce significant mechanical difficulties if the tray 42 were in contact with both.

Referring back to FIG. 2, the mounting arrangement according to the invention therefore provides an effective cooling air flow 70 within the tray 42, so that the temperature $T_3$ at the downstream end of the tray is significantly lower than the temperature $T_2$ at the same axial position outside the tray. The disconnect 54 can therefore be located further downstream, near to the downstream end of the tray 42, maximising the use of the mechanically-robust PTFE-insulated cable 50 and minimising the requirement for the mechanically-fragile MI cable 52.

In order to minimise the transfer of heat into the tray 42, the base 72 and side walls 74 should have no holes, or as few holes as possible. This ensures that the tray will provide the maximum thermal protection against radiation from the surrounding, hot components and will also minimise leakage of hot air from the annular space 82 into the tray.

Various modifications will be apparent to those skilled in the art.

The holes or slots in the end region 94 of the cooling air duct 62 may take any suitable form; for example, they may be circular holes or elongated slots, or another arrangement such as 'pepper-pot' perforations. The distribution of the holes or slots may be varied to direct the cooling air flow 64 as required by a particular application. Thus, the holes may direct the air substantially uniformly in all directions, or they may direct the air preferentially in one or more directions. It is possible that the end region of the cooling air duct 62, or the holes or slots, may be arranged to direct the cooling air flow 64 rearwards or downstream (i.e. in the same direction as the ventilation air flow 60), but this may result in less mixing of the cooling air flow with the ventilation air flow; in general it would be desirable to mix the air flows more thoroughly so that the whole channel 84 within the tray is flooded by cooling air.

In the described embodiment, two cooling air ducts 62 are shown. In other embodiments, a different number of cooling air ducts may be employed. In some circumstances, for example, more cooling air flow may be required to provide sufficient cooling for the channel 84; and this may be achieved by using more or larger cooling air ducts 62. In order to avoid leakage of hot air from the annular space 82 into the channel 84, it may be desirable to arrange for the pressure within the channel to be slightly higher than the pressure in the annular space so that there will be a small leakage flow out of the channel. If the pressure within the channel is higher than the pressure in the annular space, this will oppose or even prevent the ingress of ventilation air flow 60 through the opening 66 at the upstream end of the channel.

In other circumstances, less cooling air flow may be required, and this may be achieved by using smaller cooling air ducts or by using only one. In some applications, it may even be possible to dispense with the cooling air ducts altogether. In this case, the ventilation air flow 60 entering the channel 84 through the opening 66 would constitute the source of cooling air, and this air flow would provide sufficient cooling for the channel 84.

In some embodiments, it may be desirable to limit the fraction of the ventilation air flow 60 that enters the channel 84. This may be achieved, for example, by tapering the tray 42 so that it is narrower at its upstream end than at its downstream end; or by partially blocking the end of the tray 42 so that the opening 66 does not extend across the whole width of the tray. The opening 66 may then comprise either a single opening or a number of discrete openings.

It may be desirable, in some circumstances, to completely block the upstream end of the tray 42 so that no ventilation air flow 60 can enter the channel 84. In this case, the whole of the cooling air flow 70 through the channel would be provided by the cooling air flows 64 supplied through the cooling air ducts 62.

In a particular preferred embodiment of the invention, a gas turbine engine has two mounting arrangements in accordance with the invention, located on opposite lateral sides of the engine core. One arrangement carries the cable harnesses transmitting the 'channel A' signals and the other carries the cable harnesses transmitting the 'channel B' signals.

The invention claimed is:

1. A mounting arrangement for an electrical harness, wherein the arrangement is part of a gas turbine engine having an axial direction and a radial direction, the arrangement comprising:
   an elongate tray internally mounted adjacent but not in contact with a first casing of the engine and outward of a second casing of the engine, the tray having a base and raised sides to define a channel extending along the axial direction, the electrical harness mounted within the channel; and
   a cooling air source outward of the first casing in the radial direction, the source configured to provide cooling air into the channel to cool the electrical harness,
   wherein the electrical harness includes a first type of cable disposed within the tray and a second type of cable comprising a material different from the first type of cable, the second type of cable extending beyond the tray,
   wherein a tubular cooling air duct extends from the first casing into the channel in the radial direction, wherein the cooling air duct has a plurality of spaced outlet holes configured to eject the cooling air provided by the cooling air source from the cooling air duct into the channel in the radial direction and in the axial direction, and
   wherein the first type of cable extends from a first region and the second type of cable extends into a second region, the first region being a cooler region than the second region.

2. The arrangement of claim 1, wherein a proximal surface of the first casing forms a fourth wall for the channel.

3. The arrangement of claim 1, wherein the cooling air duct passes through the first casing.

4. The arrangement of claim 3, wherein the base of the tray is secured to the second casing.

5. The arrangement of claim 4, wherein the first casing is formed by a nacelle or a thrust reverser of the engine and the second casing is a core casing of the engine.

6. The arrangement of claim 5, wherein the cooling air source is within the nacelle or the thrust reverser.

7. The arrangement of claim 5, wherein the cooling air source is a bypass duct of the engine.

8. The arrangement of claim 5, wherein the tray extends along the axial direction.

9. The arrangement of claim 8, wherein the cooling air duct is one of a plurality of cooling air ducts spaced in the axial direction.

10. The arrangement of claim 9, wherein there is an annular space between the first casing and the second casing, and an upstream end of the tray has an opening configured to receive a portion of a ventilation flow from the annular space.

11. The arrangement of claim 1, wherein the tray is narrower at an upstream end of the tray than at a downstream end of the tray.

12. The arrangement of claim 1, wherein the first type of cable is polytetrafluoroethylene-insulated cable and the second type of cable is mineral-insulated cable.

13. The arrangement of claim 1, wherein the plurality of spaced outlet holes are provided at an end region of the cooling air duct.

14. A gas turbine engine including the arrangement of claim 1.

* * * * *